United States Patent
Schuessler

(10) Patent No.: US 10,118,230 B2
(45) Date of Patent: Nov. 6, 2018

(54) CLAMPING SYSTEM

(71) Applicant: Karl Schuessler GmbH & Co. KG, Bodelshausen (DE)

(72) Inventor: Klaus Schuessler, Hechingen-Sickingen (DE)

(73) Assignee: Karl Schuessler GmbH & Co. KG, Bodelshausen (DE)

( * ) Notice: Subject to any disclaimer, the term of this patent is extended or adjusted under 35 U.S.C. 154(b) by 0 days.

(21) Appl. No.: 15/518,003

(22) PCT Filed: Oct. 7, 2015

(86) PCT No.: PCT/EP2015/001971
§ 371 (c)(1),
(2) Date: Apr. 10, 2017

(87) PCT Pub. No.: WO2016/058677
PCT Pub. Date: Apr. 21, 2016

(65) Prior Publication Data
US 2017/0304912 A1    Oct. 26, 2017

(30) Foreign Application Priority Data
Oct. 16, 2014  (DE) .................. 20 2014 008 275 U

(51) Int. Cl.
B23B 31/107    (2006.01)
B23B 31/02     (2006.01)
B27G 13/02     (2006.01)

(52) U.S. Cl.
CPC ............ *B23B 31/107* (2013.01); *B23B 31/02* (2013.01); *B23B 31/028* (2013.01);
(Continued)

(58) Field of Classification Search
CPC ...... Y10T 279/17821; Y10T 409/30952; B23B 31/107; B23B 31/1075; B23B 31/1077; B23B 31/1076
See application file for complete search history.

(56) References Cited

U.S. PATENT DOCUMENTS 1,783,541 A * 12/1930 Hogg .................... B23B 31/103
                                                  279/77
3,645,161 A     2/1972 Wesker
(Continued)

FOREIGN PATENT DOCUMENTS

CN     1743112 A     3/2006
CN    101432088 A    5/2009
(Continued)

OTHER PUBLICATIONS

English language abstract for JP H09216107 A (1997).
(Continued)

*Primary Examiner* — Daniel Howell
(74) *Attorney, Agent, or Firm* — Caesar Rivise, PC

(57) ABSTRACT

The invention relates relates to a clamping system for clamping an object (1), in particular for clamping a cutting tool in a machine tool, comprising an accommodating bore (4) for accommodating the object (1) to be clamped, a threaded bore, which extends in the wall of the accommodating bore (4) transversely to the longitudinal axis (12) of the accommodating bore (4), and a clamping screw (6), which can be screwed in the threaded bore in order to selectively clamp or release the object (1) in the accommodating bore (4) in accordance with the screwing position of the clamping screw (6). The invention further relates to an intermediate element (9), which is arranged between the clamping screw (6) and the object (1) such that the clamping screw (6) touches the object (1) to be clamped (1) not directly, but rather indirectly by means of the intermediate (Continued)

Section A-A element (9). According to the invention, the threaded bore is preferably arranged eccentrically in relation to the accommodating bore (4).

13 Claims, 2 Drawing Sheets

(52) U.S. Cl.
CPC .......... *B23B 31/1075* (2013.01); *B27G 13/02* (2013.01); *B23B 2260/022* (2013.01); *Y10T 279/17821* (2015.01); *Y10T 409/30952* (2015.01)

(56) References Cited

U.S. PATENT DOCUMENTS

| | | | | |
|---|---|---|---|---|
| 3,762,731 | A | * | 10/1973 | Matsumoto ........... B23B 31/202 279/51 |
| 4,133,545 | A | * | 1/1979 | Komori ................. B23B 31/00 279/126 |
| 4,437,801 | A | * | 3/1984 | Lewis ................. B23B 31/1074 279/52 |
| 4,611,960 | A | * | 9/1986 | Quenneville ....... B23B 31/1075 269/241 |
| 5,403,134 | A | | 4/1995 | Andersson et al. |
| 5,601,295 | A | | 2/1997 | Baker |
| 5,876,158 | A | * | 3/1999 | Beiter ................... B23B 31/008 192/55.1 |
| 6,142,485 | A | * | 11/2000 | Muller ............... B23B 31/1075 279/83 |
| 6,299,180 | B1 | | 10/2001 | Satran et al. |
| 8,505,893 | B2 | | 8/2013 | Haimer |
| 8,556,551 | B2 | | 10/2013 | Hecht |
| 8,678,722 | B2 | | 3/2014 | Aare |
| 8,899,597 | B2 | | 12/2014 | Gerber |
| 9,238,269 | B2 | * | 1/2016 | Nakai .................. B23B 31/005 |
| 9,333,561 | B2 | | 5/2016 | Nakai et al. |
| 9,440,295 | B2 | * | 9/2016 | Pfister .................. B23B 31/008 |
| 9,943,912 | B2 | | 4/2018 | Haimer |
| 2006/0045633 | A1 | | 3/2006 | Morgulis |
| 2008/0226422 | A1 | | 9/2008 | Gordon |

FOREIGN PATENT DOCUMENTS

| | | | |
|---|---|---|---|
| CN | 101927361 A | | 12/2010 |
| CN | 101927370 A | | 12/2010 |
| CN | 103260802 A | | 8/2013 |
| DE | 3738732 A1 | | 5/1989 |
| DE | 102010034889 A1 | | 2/2012 |
| EP | 2669032 A1 | | 12/2013 |
| FR | 2941161 A1 * | | 7/2010 ........... B23B 31/005 |
| GB | 191329908 A * | | 2/1915 ........ B23B 31/1075 |
| JP | 62198035 U | | 12/1987 |
| JP | 04125505 U | | 11/1992 |
| JP | 07009212 A * | | 1/1995 |
| JP | 09216107 A | | 8/1997 |

OTHER PUBLICATIONS

English language abstract for DE 3738732 A1 (1989).
English language abstract for DE 102010034889 A1 (2012).
International Search Report from corresponding PCT/EP2015/001971 dated Jan. 8, 2016.

* cited by examiner

Section A-A

Section A-A

CLAMPING SYSTEM

CROSS-REFERENCE TO RELATED APPLICATIONS

This application is the U.S. National Phase Application of PCT/EP2015/001971, filed Oct. 7, 2015, which claims priority from DE 202014008275.8, filed Oct. 16, 2014, the contents of which applications are incorporated herein by reference in their entireties for all purposes.

BACKGROUND OF THE INVENTION

The invention relates to a clamping system for clamping an object, in particular for clamping a cutting tool in a machine tool.

A clamping system of this type is known from DE 10 2010 034 889 A1. This known clamping system has, on one side, a standard chuck which can be connected in known manner to a spindle mount of a machine tool. On the opposite side, this known clamping system has an accommodating connecting piece with an accommodating bore, wherein the cutting tool to be clamped is introduced into the accommodating bore for clamping. Situated in the wall of the accommodating connecting piece is a radially extending threaded bore into which a clamping screw can be screwed in order to lock the cutting tool in the accommodating bore of the accommodating connecting piece. For this purpose, the cutting tool has a contact surface for the clamping screw in its outer surface. On screwing into the threaded bore in the wall of the accommodating connecting piece, the clamping screw thus impacts with its free end against the contact surface in the outer surface of the cutting tool, so that the cutting tool is locked in the clamping system.

This known clamping system secures the cutting tool reliably against withdrawal from the clamping system. However, this known clamping system enables no satisfactory twistproofing against twisting of the cutting tool about its longitudinal axis.

It is therefore an object of the invention to provide a correspondingly improved clamping system.

This object can be achieved with a clamping system according to the invention.

SUMMARY OF THE INVENTION

The clamping system according to the invention has, in accordance with the aforementioned known clamping system, an accommodating connecting piece with an accommodating bore in order to accommodate the object to be clamped (e.g. a shaft of a cutting tool) in the clamped state.

Herein, in accordance with the above-described known clamping system, there is also a threaded bore situated in the wall of the accommodating connecting piece, wherein the longitudinal axis of the threaded bore extends transversely to the longitudinal axis of the accommodating bore and opens into the accommodating bore.

A clamping screw (e.g. a setscrew) can be screwed into the threaded bore in order optionally to clamp or release the object (e.g. cutting tool) dependent upon the screw position of the setscrew in the accommodating bore, as is essentially the case also with the known clamping system described in the introduction.

The clamping system according to the invention is preferably characterised in that the clamping screw does not press directly against the outer surface of the object (e.g. cutting tool) to be clamped, but indirectly via an intermediate element which is arranged between the clamping screw and the object. The clamping screw itself therefore does not touch the object to be clamped (e.g. cutting tool), even in the clamped state. Rather, in the clamped state, the clamping screw touches only the intermediate element, which in turn touches the object to be clamped (e.g. cutting tool).

It has further been mentioned above that the threaded bore for the clamping screw opens into the accommodating bore for the object to be clamped (e.g. cutting tool). In the preferred exemplary embodiment of the invention, however, the threaded bore is arranged offset eccentrically in relation to the central diameter of the accommodating bore. In a cross-section perpendicular to the longitudinal axis of the accommodating bore, the longitudinal axis of the threaded bore thus preferably forms a secant to the clear cross-section of the accommodating bore. In other words, it can be stated that the threaded bore preferably does not intersect the longitudinal axis of the accommodating bore with its longitudinal axis. The longitudinal axes of the threaded bore and the accommodating bore are thus preferably skewed in the mathematical sense.

Herein, the size of the perpendicular spacing between the longitudinal axis of the threaded bore and the central diameter of the accommodating bore is preferably 2 mm. However, it is also possible within the scope of the invention that the perpendicular spacing between the longitudinal axis of the threaded bore and the diameter of the accommodating bore, i.e. the eccentric displacement of the threaded bore, lies in the range of 1 mm to 5 mm.

This eccentric displacement of the threaded bore for the clamping screw leads, in conjunction with the pivotable intermediate element, thereto that the object to be clamped (e.g. cutting tool) is also reliably secured against twisting about its longitudinal axis.

In a preferred exemplary embodiment of the invention, the clamping screw has a cup socket at its free inserting end. In this exemplary embodiment, the intermediate element has, on the side of the clamping screw, a correspondingly adapted ball head which is mounted in the cup socket of the clamping screw, so that the intermediate element is pivotable relative to the clamping screw. The cup socket at the end of the clamping screw, on one side, and the ball head of the intermediate element, on the other side, thus together form a pivot joint which preferably enables a universal pivoting movement of the intermediate element relative to the clamping screw.

By this means it is preferably possible that the intermediate element is pivotable in a first pivot plane relative to the clamping screw wherein the first pivot plane extends transversely to the accommodating bore. In addition, the intermediate element is preferably also pivotable in a second pivot plane relative to the clamping screw, wherein the second pivot plane extends parallel to the accommodating bore in the accommodating connecting piece. In the preferred exemplary embodiment of the invention, however, the intermediate element is pivotable in all directions relative to the clamping screw.

It has been mentioned above that in the clamping system according to the invention, the clamping screw presses indirectly against the object to be clamped (e.g. cutting tool) via the intermediate element. For this purpose, the intermediate element preferably has a flattening on the side of the object to be clamped (e.g. cutting tool), i.e. a planar surface region. Accordingly, the object to be clamped (e.g. cutting tool) also has a corresponding flattening, i.e. a planar surface region, in its outer surface. In the clamped state of the object (e.g. cutting tool), the flattening on the intermediate element then lies in plane-parallel arrangement against the flattening on the object to be clamped (e.g. cutting tool).

It should be mentioned here that the flattening in the outer surface of the object to be clamped is preferably inclined along the longitudinal axis of the accommodating bore, specifically so that the object to be clamped widens along its flattening toward its free end. As a result of this inclination of the flattening in the outer surface of the object to be clamped, it is achieved that in the clamped state, the clamping screw with the intermediate element reliably prevents axial withdrawal of the object (e.g. cutting tool) from the clamping system.

It has already been briefly mentioned above that the threaded bore in the wall of the accommodating connecting piece extends transversely to the longitudinal axis of the accommodating bore. Preferably, the threaded bore extends with its longitudinal axis in a plane which lies perpendicularly to the longitudinal axis of the accommodating bore. This means that the threaded bore is not inclined with its longitudinal axis relative to the longitudinal axis of the accommodating bore either in one direction or the other.

However, it is also possible in the context of the invention that the threaded bore extends with its longitudinal axis inclined to the longitudinal axis of the accommodating bore, as known from DE 10 2010 034 889 A1, i.e. in a plane which extends perpendicularly to the longitudinal axis of the accommodating bore.

It should also be mentioned that the accommodating bore is preferably substantially cylindrical, as is the case also in the known clamping system described in the introduction.

With regard to the materials of the object to be clamped, the intermediate element and the clamping screw, a wide variety of possibilities exist. However, it is advantageous if the intermediate element and the clamping screw are made of a softer material than the object to be clamped. This is, however, usually the case anyway if the object to be clamped is a cutting tool.

With regard to the clamping screw, it should be mentioned that it is preferably a setscrew which can have, for example, a hexagonal screw head or a slotted screw head.

It should finally also be mentioned that the invention claims protection not only for the above described inventive clamping system as a single system. Rather, the invention also claims protection for a machine tool (e.g. a milling machine) with such a clamping system for clamping a cutting tool (e.g. milling tool).

BRIEF DESCRIPTION OF THE DRAWINGS

Other advantageous developments of the invention are disclosed in the subclaims or are described below in greater detail together with the description of the preferred exemplary embodiment of the invention, making reference to the drawings. In the drawings:

DETAILED DESCRIPTION OF PREFERRED EMBODIMENTS

The drawings show a preferred exemplary embodiment of an inventive clamping system for clamping a cutting tool 1 (e.g. milling tool) in a machine tool (e.g. milling machine).

On the side of the machine tool, the inventive clamping system has a standard chuck 2 which can be mechanically connected to a spindle mount of the machine tool. The mechanical connection of the clamping system to the machine tool is however not essential to the invention and can also take place in another way than with the standard chuck 2.

On the side opposite to the standard chuck 2, the inventive clamping system has an accommodating connecting piece 3 with an accommodating bore 4, wherein the cutting tool 1 is introduced axially into the accommodating bore 4 of the accommodating connecting piece 3 for clamping.

Figure 3:
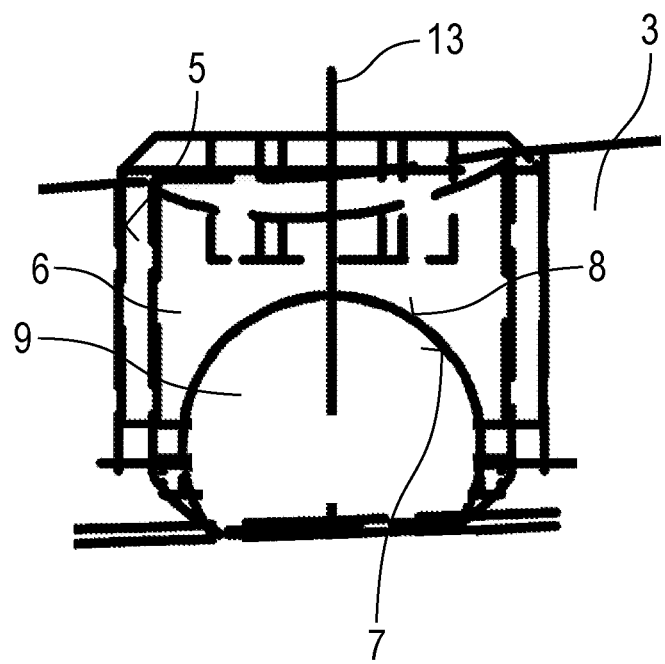
FIG. 3 is an enlarged detail view of FIG. 1.

Situated in the wall of the accommodating connecting piece 3 is a threaded bore 5 (see FIG. 3) into which a clamping screw 6 is screwed. In the exemplary embodiment shown, the clamping screw 6 has a hexagonal socket in its screw head, although the clamping screw 6 can also be constructed differently.

At its free inserting end, the clamping screw 6 has a cup socket 7 (see FIG. 3), the cup socket 7 in the clamping screw 6 forming a pivot joint together with a ball head 8 of an intermediate element 9. The intermediate element 9 can thus be pivoted universally relative to the clamping screw 6.

On the side facing away from the clamping screw 6, the intermediate element 9 has a flattening 10 which, in the clamped state lies in plane-parallel arrangement against a corresponding flattening 11 in the outer surface of the cutting tool 1.

Figure 1:
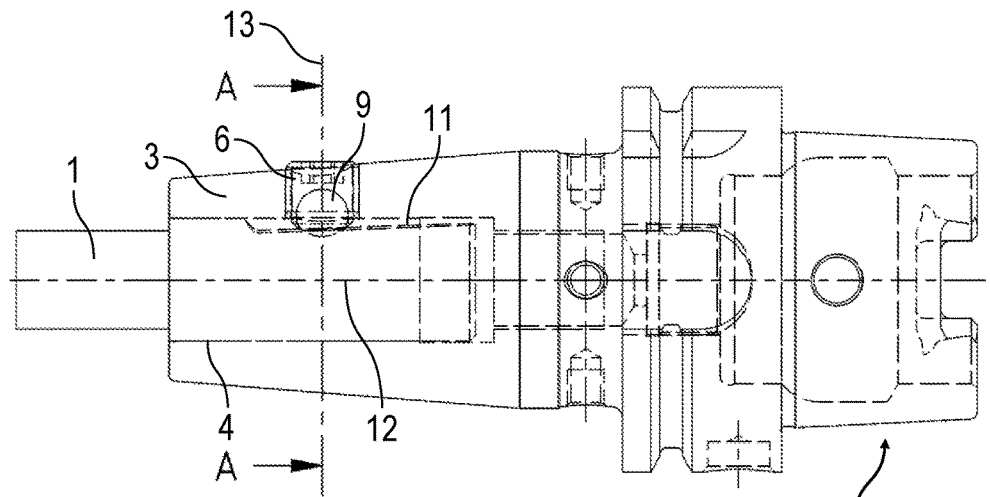
FIG. 1 is a clamping system according to the invention in a longitudinal section along the longitudinal axis of the accommodating bore for the cutting tool to be clamped.

It is apparent from FIG. 1 that the flattening 11 in the outer surface of the cutting tool 1 is inclined relative to the longitudinal axis 12 of the accommodating bore 4, specifically in such a way that in the region of the flattening 11, the cutting tool 1 widens toward its free end. By means of this inclination of the flattening 11, it is achieved that the cutting tool 1 is securely fixed against an axial withdrawal.

Figure 2A:
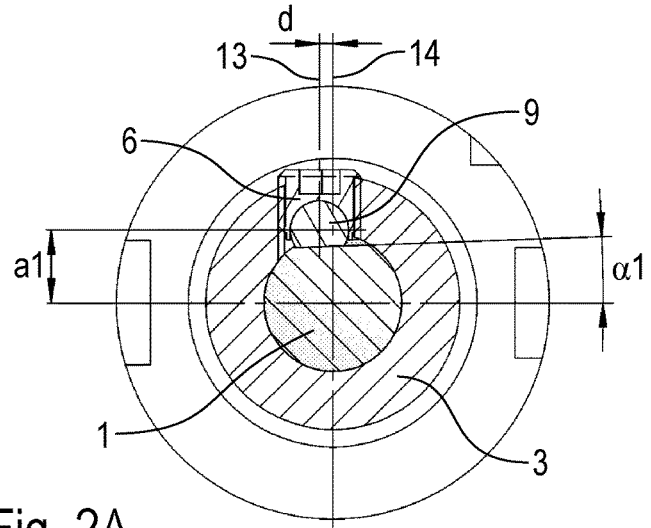
FIG. 2A is a cross-sectional view through the inventive clamping system of FIG. 1 along the section line A-A in FIG. 1.
Figure 2B:
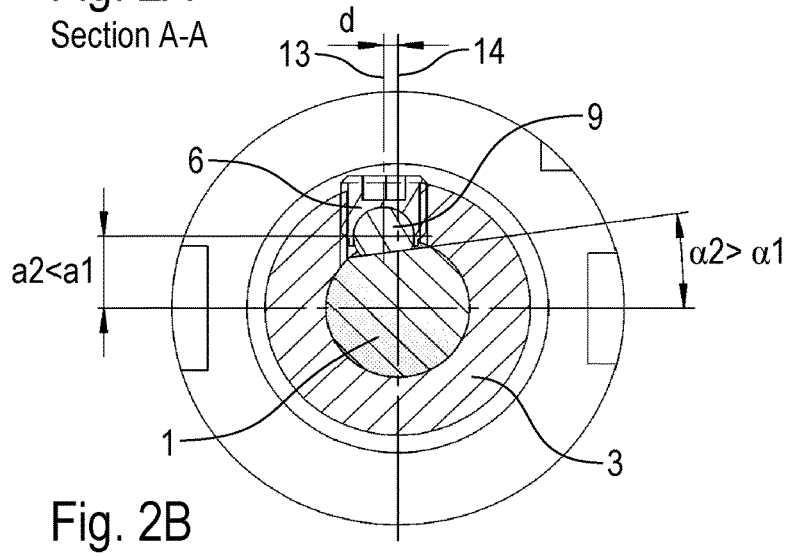
FIG. 2B is another view according to FIG. 2A in another angular position of the clamped cutting tool.
Figure 4:
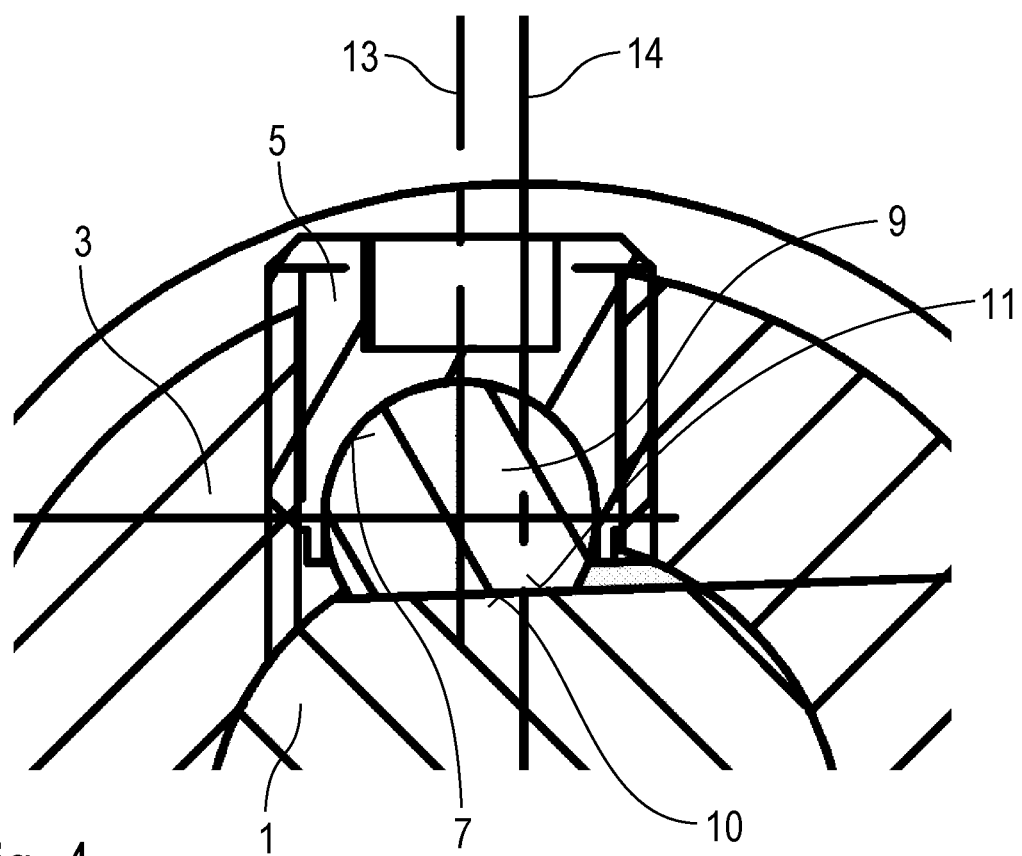
FIG. 4 is an enlarged detail view of FIGS. 2A and 2B.

From FIGS. 2A, 2B and 4 it is also apparent that the threaded bore 5 for the clamping screw 6 has a longitudinal axis 13 which is eccentrically offset relative to a central diameter 14 of the accommodating bore 4. The perpendicular spacing between the longitudinal axis 13 of the threaded bore 5 and the central diameter 14 of the accommodating bore 4 in this exemplary embodiment amounts to d=2 mm. This eccentric arrangement of the clamping screw 6 has the result that the intermediate element 9 pivots relative to the clamping screw 6 on screwing in the clamping screw 6, wherein the plane-parallel contact of the flattening 10 of the intermediate element 9 against the flattening 11 in the outer surface of the cutting tool 1 is retained.

In the angular position according to FIG. 2A, the cutting tool 1 has a value of $\alpha_1=2°$. In this angular position, the spacing between the midpoint of the intermediate element 9 and the midpoint of the accommodating bore 4 a1=10.55 mm.

In the angular position of the cutting tool 1 according to FIG. 2B, however, the corresponding angle $\alpha_2=8°$, which corresponds to a spacing a2=10.44 mm.

It is evident therefrom that a twisting of the cutting tool 1 about its longitudinal axis is only possible if the clamping screw 6 is loosened again. The inventive clamping system therefore fixes the cutting tool 1 not only against an axial withdrawal, but also against a rotation about the longitudinal axis 12.

The invention is not restricted to the above-described preferred exemplary embodiment. Rather a plurality of variants and derivations is possible which also make use of the inventive concepts and therefore fall within the protective scope. In particular, the invention also claims protection for the subject matter and the features of the subclaims separately from the claims to which they each refer. For example, the invention also claims protection for the concept of an eccentric arrangement of the clamping screw separately from the intermediate element.

REFERENCE SIGNS

1 Cutting tool
2 Standard chuck
3 Accommodating connecting piece
4 Accommodating bore
5 Threaded bore
6 Clamping screw
7 Cup socket of the clamping screw
8 Ball head of the intermediate element
9 Intermediate element
10 Flattening on the intermediate element
11 Flattening in the outer surface of the cutting tool
12 Longitudinal axis of the accommodating bore
13 Longitudinal axis of the threaded bore
14 Diameter of the accommodating bore
α1, α2 Angular position of the cutting tool
d Offset between the longitudinal axis of the threaded bore and the diameter of the accommodating bore
a1, a2 Spacing between central plane of the accommodating bore and the central point of the clamping ball

The invention claimed is:

1. A clamping system for clamping an object, comprising:
a) an accommodating bore for accommodating the object to be clamped;
b) a threaded bore which extends in a wall of the accommodating bore transversely to a longitudinal axis of the accommodating bore;
c) a clamping screw which is screwable in the threaded bore in order to optionally clamp or release the object dependent upon a screwed position of the clamping screw in the accommodating bore;
d) an intermediate element being arranged between the clamping screw and the object, so that the clamping screw does not directly touch the object to be clamped, but rather indirectly via the intermediate element; and
e) the threaded bore being arranged offset eccentrically to a diameter of the accommodating bore, wherein
the clamping screw has a cup socket at a free inserting end thereof, and
the intermediate element has, on a side of the clamping screw, a ball head which is mounted in the cup socket of the clamping screw, so that the intermediate element is pivotable relative to the clamping screw.

2. The clamping system according to claim 1, wherein
a) the intermediate element is pivotable in a first pivot plane relative to the clamping screw wherein the first pivot plane extends transversely to the accommodating bore, and
b) the intermediate element is pivotable in a second pivot plane relative to the clamping screw wherein the second pivot plane extends parallel to the accommodating bore.

3. The clamping system according to claim 1, wherein the intermediate element is pivotable in all directions relative to the clamping screw.

4. The clamping system according to claim 3, wherein
a) the intermediate element has a flattening on a side of the object to be clamped,
b) an outer surface of the object to be clamped has a flattening, and
c) in a clamped state of the object, the flattening on the intermediate element then lies in plane-parallel arrangement against the flattening on the object to be clamped.

5. The clamping system according to claim 4, wherein the flattening in the outer surface of the object to be clamped is inclined along the accommodating bore so that the object to be clamped widens along its flattening toward a free end thereof.

6. The clamping system according to claim 1, wherein the threaded bore extends in a plane which lies perpendicularly to the longitudinal axis of the accommodating bore.

7. The clamping system according to claim 6, wherein a longitudinal axis of the threaded bore does not intersect the longitudinal axis of the accommodating bore.

8. The clamping system according to claim 1, wherein perpendicular spacing between a longitudinal axis of the threaded bore and the diameter of the accommodating bore is greater than 1 mm and smaller than 5 mm.

9. The clamping system according to claim 1, wherein the clamping screw fixes the object to be clamped by use of the intermediate element against axial withdrawal from the accommodating bore.

10. The clamping system according to claim 1, wherein the clamping screw fixes the object to be clamped by use of the intermediate element against twisting about a longitudinal axis thereof.

11. The clamping system according to claim 1, wherein
a) the accommodating bore is substantially cylindrical, and
b) the intermediate element is made of a softer material than the object to be clamped, and
c) the intermediate element is made of a softer material than the clamping screw, and
d) the clamping screw, the intermediate element and the object to be clamped each consist of steel, and
e) the clamping screw is a setscrew.

12. A machine tool having a clamping system according to claim 1 for clamping a cutting tool.

13. The machine according to claim 12, wherein the machine is a milling machine and the cutting tool is a milling tool.

* * * * *